May 15, 1951

A. E. F. LENZ 2,553,519

ONION TOPPER

Filed July 25, 1946

INVENTOR.
ARTHUR E. F. LENZ

BY John W. Michael
ATTORNEY.

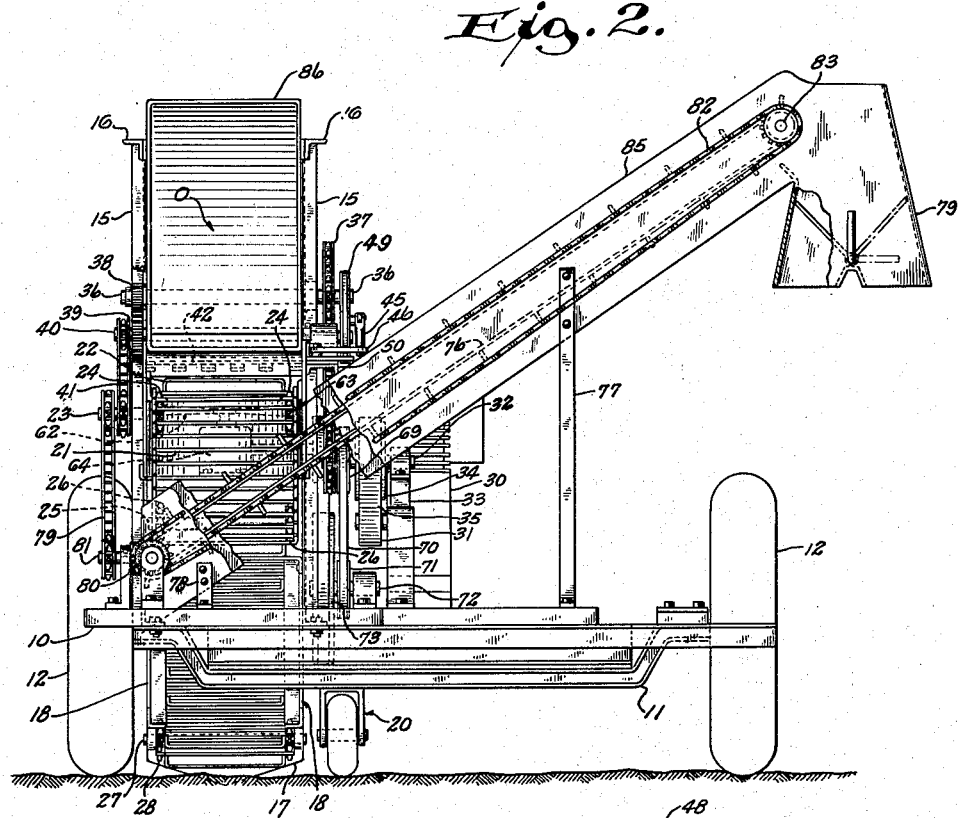
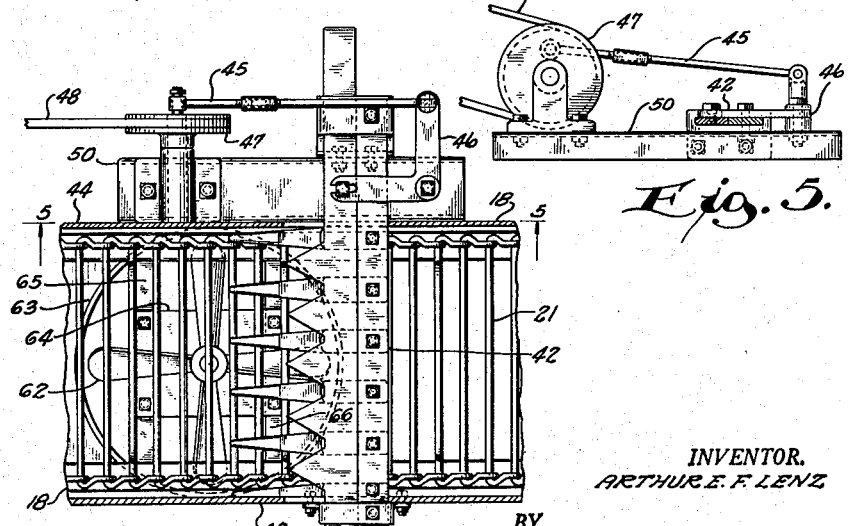

May 15, 1951 — A. E. F. LENZ — 2,553,519
ONION TOPPER
Filed July 25, 1946 — 3 Sheets-Sheet 3

INVENTOR.
ARTHUR E. F. LENZ
BY John W. Michael
ATTORNEY

Patented May 15, 1951

2,553,519

UNITED STATES PATENT OFFICE 2,553,519

ONION TOPPER

Arthur E. F. Lenz, Larsen, Wis.; Lovella Lenz administratrix of said Arthur E. F. Lenz, deceased Application July 25, 1946, Serial No. 686,088

2 Claims. (Cl. 55—9)

This invention relates to improvements in harvesting machines, particularly to the kind adapted for harvesting onions and removing the tops during the harvesting.

One of the difficulties in harvesting onions and topping them is the bruising of the onions or the cutting of the outer protecting layers by the machinery. Onions so damaged cannot be stored for any length of time as rot, decay and disease set in also endangering the undamaged onions.

It is therefore an object of this invention to provide an onion-topping machine which will remove the tops of onions without bruising the onion or damaging its outer protecting layers.

Another object of this invention is to provide an onion harvesting machine which will dig the onions from the ground and convey them to storage bags and during such conveying process remove the tops of the onions without bruising the onion or wounding its outer protective layer.

A still further object of this invention is to provide an onion harvesting and topping machine which will dig the onions from the ground, remove the tops without bruising the onions, distribute the severed tops over the ground from which the onions have been dug, and transfer the onions to storage bags.

These objects are obtained by providing a power-operated harvesting machine having a plow or gatherer which is guided along the furrow in which the onions are growing to dig or remove the onions from the furrow while at the same time severing the roots from the onion. Behind the plow there is an open-work, screen or slat conveyor which picks up and carries the onions from the plow to a topping station. At the topping station a continuous stream or blast of air is forced through the conveyor with enough force to cause the onion tops to assume an erect position substantially at right angles to the conveyor as they ride along with it through the cutting station. Cutting mechanism in the form of a sickle bar or rotary cutting knife is positioned adjacent the top of the conveyor at the cutting or topping station to cut off the onion tops without contacting the onion. The tops thus cut are ejected by the same blast of air to the rear of the harvesting machine and deposited on the ground. The topped onions are conveyed out of the topping station and are deposited in bags for handling and storing. In the travel of the onions from the plow to the topping station, most of the soil clinging to the onions is removed and dropped through the conveyor to the ground by the normal vibration of the machine. Whatever portion of the soil not so removed will be removed in the cutting station by the action of the continuous blast of air. Because the onions are all standing with their tops in erect position, substantially perpendicular to the conveyor, the sickle bar or other cutting mechanism will not touch the onion itself as the top is severed therefrom. Thus none of the onions have their outer protective layers damaged and the chance for spoilage is lessened. By depositing the cut tops on the ground as the harvester travels along they may add in time to the humus content of the soil, thus renovating it and maintaining its productive level.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawings, in which:

Figure 2 is a view in rear elevation of the onion harvesting and topping machine shown in Figure 1, with parts broken away for the sake of clarity and illustration;

Figure 4 is a fragmentary top plan view of the topping station, taken from the position 4—4 of Figure 1, showing the sickle bar mechanism for cutting the tops from the onions;

Figure 5 is a sectional view taken on the line 5—5 of Figure 4; and

Figure 1:
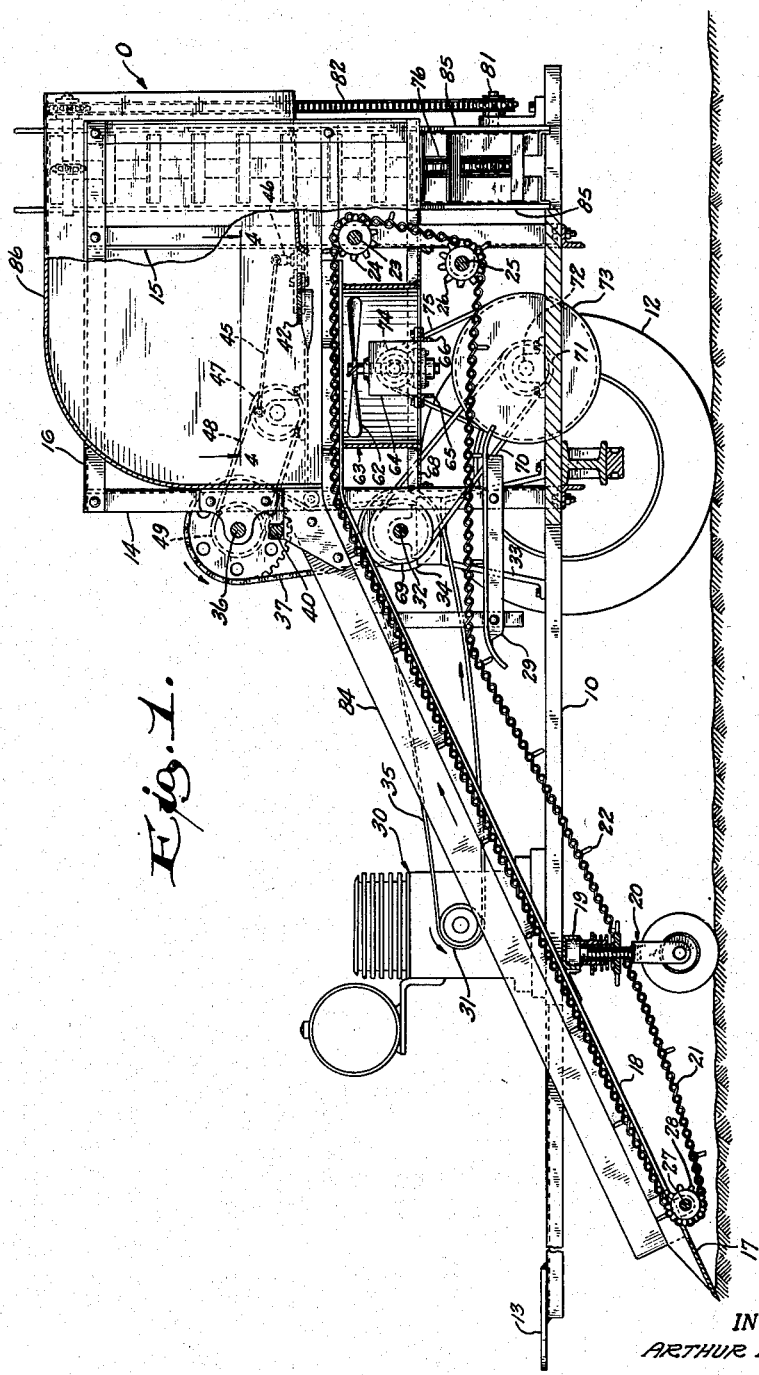
Figure 1 is a view partly in side elevation and partly in section of an onion harvesting and topping machine embodying the present invention.
Figure 3:
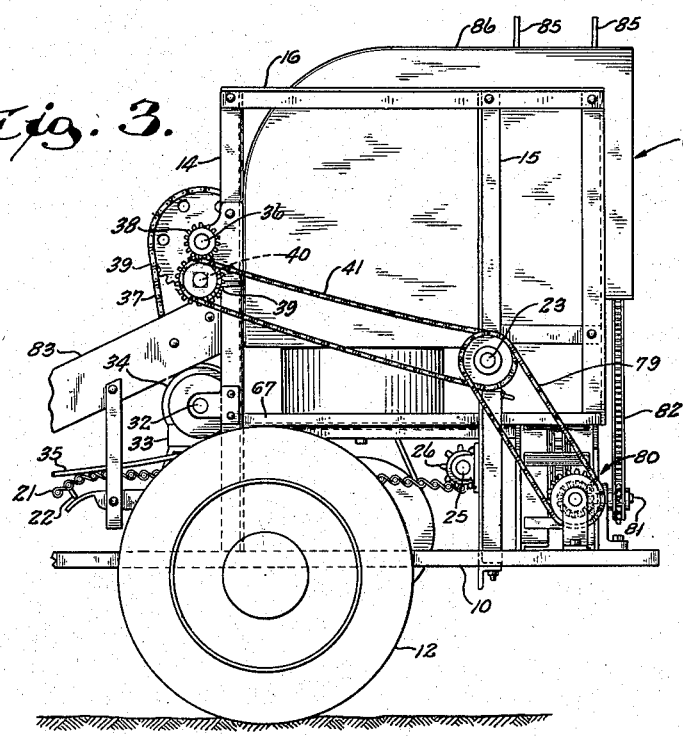
Figure 3 is a fragmentary view in side elevation of the onion harvesting and topping machine shown in Figure 1.

Referring to the drawings by reference numerals, the onion harvesting and topping machine comprises a main longitudinal frame 10 which is supported on an axle 11 extending between a pair of pneumatic tired wheels 12. The forward end of the main frame 10 is provided with a customary hitch 13 by means of which the machine is attached to tractors or other hauling means. This hitch may be made adjustable to vary the height at which the forward end of the main frame is carried in order to regulate the depth at which the plow operates.

On the frame 10 there is mounted a front pair of transversely spaced upright supports 14 and a rear pair of transversely spaced upright supports 15. These supports are joined together at the top by members 16 to form a rigid mounting frame. These members form the support for the digger, the conveyor, the topping mechanism, and the packaging conveyor. The plow or gatherer 17 is mounted at the forward end of the conveyor support 18. The support 18 extends from upright support 15 forwardly to upright support 14, thence forwardly and downwardly toward the ground. It is attached to the main frame member 10 by a transverse member 19. In order to assist in maintaining the plow 17 at a proper cutting depth with respect to the ground, there is provided a vertically adjustably mounted supporting wheel indicated generally at 20. An open-work rod or slat type conveyor 21 with spaced flights 22 has its upper run sliding on the inwardly disposed legs of the conveyor supports 18. It rides over and is driven by sprockets 24 at the rear end of the run. These sprockets are carried by a conveyor drive shaft 23 mounted in bearings on the supports 15. A lower shaft 25 also mounted on the supports 15 below the shaft 23 has idler sprockets 26 about which the conveyor 18 travels to change its direction and provide for its return run. Between the forward end of the conveyor support 18 and the plow 17 there is also mounted an idler shaft 27 provided with sprockets 28 about which the conveyor 18 runs to make the turn for the top run. In order to have the conveyor clear certain other elements of the machine on its return run, there are provided short guides 29 formed of a pair of operatively spaced angle irons. As thus far described it will be seen that upon forward movement of the harvester, the plow 17 will dig under the onions growing in furrows, sever their roots, and cause the onions and some dirt and chaff with them to slide up the surface of the plow 17 to come in contact with the conveyor 21 and its flights 22. At the same time as the harvester is caused to move forwardly the conveyor 21 is also operated and receives the onions from the gatherer 17 and conveys them on top of the conveyor to the top cutting station. During this travel the normal vibration of the conveyor and harvester will loosen a considerable amount of dirt and chaff which will readily drop through the open-work conveyor to be deposited on the ground.

In order to supply motive power to operate the conveyor as well as the mechanisms forming a part of the topping station hereinafter described, there is provided a gasoline engine 30 or other type of power generating device. The engine 30 is mounted on the main frame or base 10 and has a power take-off pulley 31. A jack shaft 32 is carried in bearings on each of the supports 14 and standard 33. Its outer end is supported in a bearing mounted on a standard 33. This jack shaft has a main driven pulley 34 which is connected to the power take-off by a flat belt 35 by which power is supplied to the jack shaft 32. Power from the jack shaft 32 is transmitted to a secondary jack shaft 36, also mounted in bearings carried on the supports 14 by a chain and sprocket reduction drive indicated at 37. The secondary jack shaft 36 has a driver pinion 38 meshing with a driven pinion 39 on a countershaft 40, also mounted on the supports 14. A chain and sprocket transmission generally indicated at 41 transmits the power from the counter-shaft 40 to the conveyor drive shaft 23. The source of power 30 drives the power take-off 31 in a counterclockwise direction, and the conveyor drive shaft 23 is driven at a great reduction in a clockwise direction to cause the conveyor to travel in the upward direction as indicated by the arrow in Figure 1. The ratios of the various transmission elements are proportioned depending upon the normal rated speed of the motive power to maintain the speed of the conveyor in feet per minute slightly in excess of the forward movement of the harvester in feet per minute. This will prevent onions from piling up on the gatherer or plow 10.

Figure 6:
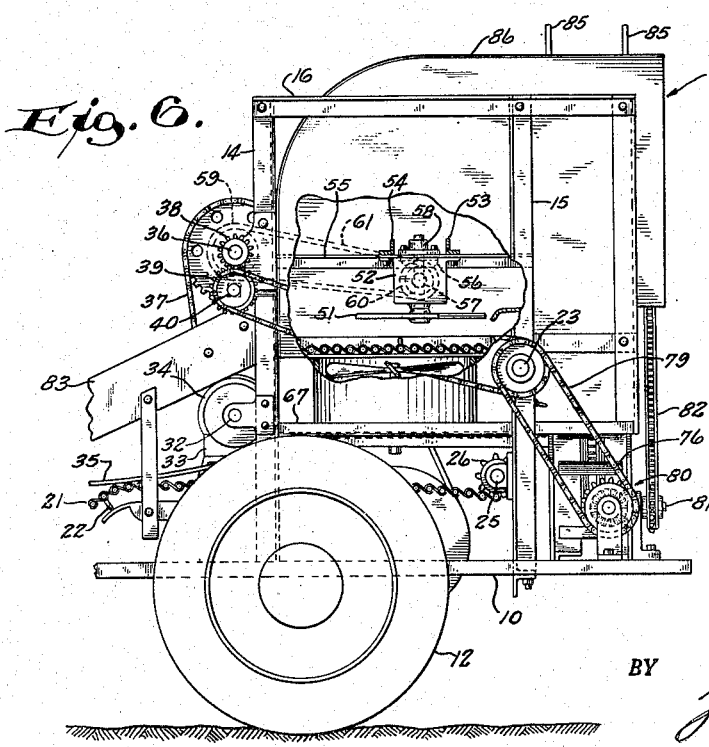
Figure 6 is a fragmentary side elevational view with parts broken away to show the revolving knife cutter constituting a modification of the onion topping mechanism of this invention.

In order to "top the onions" (sever the tops from the bodies) without injuring the onions or damaging their outer protective layer, there is provided on the upper run of the conveyor a topping station. This station is situated between the upright supports 14 and 15 at which point the run of the conveyor is substantially horizontal. The topping station comprises a cutting mechanism which in the embodiments shown in Figures 1 to 5, inclusive, is a sickle bar 42 of general and well-known construction. The sickle bar 42 extends transversely of the conveyor 21 and is positioned above it a distance which will permit the bodies of onions to be topped to ride on the conveyor and pass under the sickle bar without contacting the sickle bar. In this embodiment the sickle bar is carried on supporting members 43 and 44 (see Figure 4) which extend between the supports 14 and 15 on each side of the conveyor. It is preferable to make these supports vertically adjustable to vary the distance of the sickle bar from the top of the conveyor depending upon the average size of the onions being harvested. In this case the sickle bar has substantially six fixed cutting members and five movable cutting members. Reciprocal cutting movement is provided for the cutter bar by means of a pitman 45 and a bell crank 46 shown in detail in Figures 4 and 5. A pitman driving pulley 47 is driven by a belt 48 from a pulley 49 mounted on the secondary jack shaft 36. The bell crank 46 and bearing and shaft for the pitman pulley 47 are mounted on a channel-like member 50 secured to the supporting member 44. By this linkage the rotary movement of the secondary jack shaft 36 is transmitted to reciprocal movement of the cutter of the sickle bar. The modification shown in Figure 6 merely substitutes a rotary cutter 51 for the sickle bar 42. The rotary cutter is likewise positioned above the conveyor 21 a sufficient distance to permit the bodies of onions being harvested to pass beneath the cutter without contacting the same. The rotary cutter is suported from a gear box 52 mounted on transverse members 53 and 54 extending between supports 55 carried by each opposite pair of upright members 14 and 15. A set of bevel gears 56 mounted in the gear box 52 transmits rotary power from the transverse shaft 57 to the vertical shaft 58 on which is mounted the cutter 51. Rotative power to the shaft 57 is provided from the secondary jack shaft 36 by a pulley 59 mounted thereon driving a pulley 60 mounted on the transverse shaft 57 by a belt 61.

As the onions carried on the top run of the conveyor 21 reach the cutting station, it is necessary to cause the tops of the onions to be brought within the cutting scope of the cutting mechanism in order to sever the tops from the onions. This is accomplished by causing a continuous stream or blast of air to be forced upwardly through the open-work of the conveyor and through the onions riding thereon. This stream of air should be of an area as great as the width of the conveyor and must have sufficient force to blow the tops of the onions upwardly so that they assume a vertical position relative to the surface of the conveyor. The stream of air should not, however, have sufficient velocity or force to cause the bodies of the onions to raise above the surface of the conveyor. To accomplish this, there is positioned below the upper run of the conveyor a rotating fan 62 mounted in an air-directing housing or tubular casing 63. The housing in this exemplification is circular in shape to obtain the most efficient results from the fan 62. It is not essential that the fan 62 be mounted close to the top run of the conveyor so long as the top of the air-directing tunnel terminates just beneath the top run of the conveyor. The purpose of this is to prevent any detrimental escape of air laterally of the top of the casing and to direct the greatest amount of air to immediately pass through the conveyor. A bevel gear box 64 which mounts a transverse shaft and a vertical shaft in precisely the same manner as that above described for the rotary cutter 51 is mounted on transverse members 65 and 66 which are secured to longitudinal supports 67 and 68 fastened to each opposite pair of upright members 14 and 15. Power is supplied to the transverse shaft from the jack shaft 32 by means of a step-up transmission consisting of a pulley 69 mounted on the jack shaft 32, pulleys 71 and 73 mounted on a tertiary jack shaft 72 and a pulley 74 on the transverse shaft of the gear box 64; the pulleys 69 and 71 are connected by belt 70 and the pulleys 73 and 74 by belt 75. This transmission produces the required velocity of the fan 62 to create an air stream strong enough to cause the onion top to take an erect position. The ratio shown, however, may vary depending upon the number of blades in the fan, their pitch, and the power source. As onions move along on the top run of the conveyor, they will be carried over the top of the air-directing tunnel 63 at which time they will be subjected to the stream of air which continuously passes upwardly through the conveyor. This stream of air lifts the tops of the onions upwardly and causes them to assume an erect position relative to the conveyor top and remain in this position as they continue to pass over the area of the opening of the tunnel 63. While in this position the tops are moved into direct contact with the cutting teeth of the sickle bar 42 or blades of the revolving cutter 51 and are severed. To assure that the onion tops will be in such erect position prior to their coming within the scope of the sickle bar or revolving cutter, the center of the air-directing tunnel is placed ahead of the sickle bar or ahead of the center of the rotary cutter. Thus there is full opportunity for the onion tops to rise to vertical position before coming into the cutting swath.

After the tops of the onions have been severed, the bodies continue along the conveyor until arriving at the discharge place where the conveyor runs over the end shaft 23. At this place they will be discharged and fall into a stacking conveyor indicated generally at 76. The stacking conveyor 76 is a standard item of manufacture and will not be described in detail. It is mounted on the rear of the harvester and its lower end is below the discharge end of conveyor 18. From there it extends upward and outward to the side of the harvester and is held by braces 77 and 78. The upper end of the stacking conveyor is provided with a dual discharge spout 79 by which discharge can be directed to either of two bags which may be positioned thereon. The power to operate the stacking conveyor 76 is derived from the conveyor drive shaft 23 by means of a sprocket and chain drive 79 to a bevel gearing unit 80 having a driven shaft 81. The shaft 81 is in turn connected by a chain belt 82 to the upper drive shaft 83 of the stacking conveyor 76. The stacking conveyor thus travels at substantially the same number of feet per minute as does the open-work conveyor 21.

The upper run of the conveyor 21, to assure against loss of onions, may be provided with side boards 84. Also the stacking conveyor 76 may have sides 85 to guide the onions thereon. It has been found that a stream of air sufficiently powerful to raise the onion tops to vertical position will also be strong enough to carry them in such stream after they have been severed. The machine is therefore provided with a discharge funnel or casing 86 which has its intake opening positioned above the cutting station of the conveyor and its discharge opening O facing to the rear of the conveyor. It is formed from sheet metal and has side walls and a curved top wall and fits within the supporting uprights 14 and 15 and is held in place by them. In the operation of the harvester the cut tops are ejected rearwardly through the discharge opening O and fall to the ground behind the harvester where they may be left to rot and decay and add to the humus content of the soil.

Although only one embodiment of the invention is shown and described herein, it will be understood that this application is intended to cover such changes or modifications as come within the spirit of the invention or scope of the following claims.

I claim:

1. An onion harvesting and topping machine comprising a plow supported by said machine for gathering growing onions as the machine is advanced along the ground, an onion top cutting mechanism mounted on said machine at a level above the plow and rearwardly thereof, an endless open flight conveyor having a top run extending upwardly and rearwardly from the plow and including a substantially horizontal portion underlying said top cutting mechanism, guide means for the return run of the conveyor positioned on said machine to dispose a portion of said return run in spaced relation to and beneath the horizontal portion of said top run, a vertically axised blower mounted between the spaced portions of the conveyor runs and beneath said top cutting mechanism, and means on said machine for driving said blower to direct a blast of air upwardly through the top run of the conveyor to erect the tops of onions carried by said conveyor into operative position with respect to said top cutting mechanism.

2. An onion harvesting and topping machine comprising a plow supported by said machine for gathering growing onions as the machine is advanced along the ground, an onion top cutting mechanism mounted on said machine at a level above the plow and rearwardly thereof, an endless open flight conveyor having a top run extending upwardly and rearwardly from the plow and including a substantially horizontal portion underlying said top cutting mechanism, guide means for the return run of the conveyor positioned on said machine to dispose a portion of said return run in spaced relation to and beneath the horizontal portion of said top run, a vertically axised blower mounted between the spaced portions of the conveyor runs and beneath said top cutting mechanism, an open ended tubular casing for the blower positioned between the top and return runs of the conveyor and having an upwardly directed air discharge opening, a discharge casing positioned on the machine above the top run of the conveyor and having a downwardly directed intake opening substantially aligned with the discharge opening of said tubular casing, said cutting mechanism including a cutter member disposed between the top run of the conveyor and said intake opening of the discharge casing, means mounting the cutter member for operation in a substantially horizontal plane, and means on the machine for driving the blower to direct a blast of air upwardly through the top run of the conveyor to erect the tops of onions carried by the conveyor into operative position with respect to said cutter member.

ARTHUR E. F. LENZ.

REFERENCES CITED

The following references are of record in the file of this patent:

UNITED STATES PATENTS

| Number | Name | Date |
|---|---|---|
| 703,099 | Taylor | June 24, 1902 |
| 926,286 | Petrie | June 29, 1909 |
| 1,074,827 | Winchester | Oct. 7, 1913 |
| 1,294,766 | Burdick | Feb. 18, 1919 |
| 1,386,222 | Bailey | Aug. 2, 1921 |
| 1,466,889 | Mortensen | Sept. 4, 1923 |
| 1,875,072 | Maryott | Aug. 30, 1932 |

FOREIGN PATENTS

| Number | Country | Date |
|---|---|---|
| 52,358 | Netherlands | Apr. 15, 1942 |